(Model.)
R. LEAVITT.
SEWING MACHINE SHUTTLE.
No. 250,446. Patented Dec. 6, 1881.
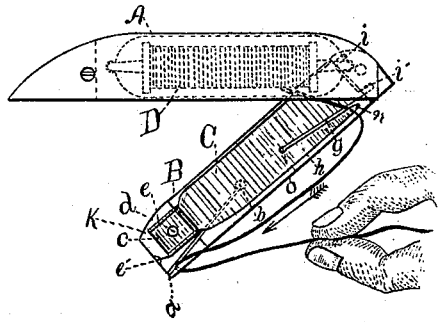
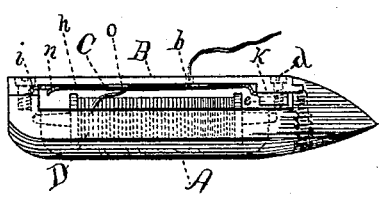
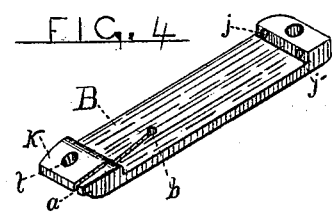
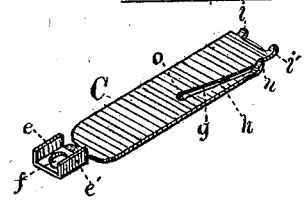
Witnesses
Edward Flather
Thomas Evans
Inventor
Rufus Leavitt
Per
Geo. D. Phillips
N. PETERS, Photo-Lithographer, Washington, D. C.

UNITED STATES PATENT OFFICE.

RUFUS LEAVITT, OF BRIDGEPORT, CONNECTICUT, ASSIGNOR TO THE HOWE SEWING MACHINE COMPANY, OF SAME PLACE.

SEWING-MACHINE SHUTTLE.

SPECIFICATION forming part of Letters Patent No. 250,446, dated December 6, 1881.

Application filed March 28, 1881. (Model.)

To all whom it may concern:

Be it known that I, RUFUS LEAVITT, of the city of Bridgeport, county of Fairfield, and State of Connecticut, have invented a new and useful Improvement in Shuttles for Sewing-Machines; and I do hereby declare that the following is a full, clear, and exact description of the invention, which will enable others skilled in the art to which it appertains to make and use the same.

My invention relates to an improved self-threading device for sewing-machine shuttles.

The object of my invention is to provide a self-threading device for shuttles of simple construction, possessing a smooth, even, and uniform tension.

My invention consists of a flat, thin, flexible spring combined with the shuttle-plate, the said spring having projecting prongs, which enter holes provided in the shuttle-plate, forming a fulcrum for the spring, operating also to prevent side play. The other end of the tension-spring is secured to the shuttle-plate by a screw passing through the spring and plate into an independent threaded nut resting on the tension-spring, the said spring having upward-projecting sides, which operate to prevent the nut from turning, forming also an inclosed seat for the nut.

Heretofore flat tension-springs have been used on shuttles; but the spring is held rigid at one end, either by a rivet or screw fitting threaded hole in the spring, bringing the tension close to that part of the spring secured by the screw or rivet, the tension thereby decreasing in proportion as the distance increases from the screw or rivet, and will not therefore give an even tension. In my improved device the tension is the same throughout the entire length of the spring. The prongs or projections on one end of the spring, entering holes provided in the plate, operate as a fulcrum to secure and preserve the elasticity of the spring, and the nut and screw will operate and control the other end, thus keeping the spring parallel with the plate. The spring will accommodate itself to any unevenness of the thread, which causes an unevenness of the tension, when the thread is between the spring and plate, by the parallel movement of the prongs or projections engaging with the holes in the plate, thus keeping the tension uniform, and having a tendency also to keep the spring parallel.

To more clearly understand my invention, reference is had to the drawings accompanying this specification and forming part of the same, in which—

Figure 1 is a top view of the shuttle A, having the swinging latch B, provided with the diagonal slot a, extending to and terminating in the thread-hole b near the center of the latch. Fig. 2 represents a view of the under side of the shuttle with the latch B swung around, and also the operation of threading. Fig. 3 is a side view of the shuttle threaded and ready to operate. Fig. 4 is a detached view of the latch B. Fig. 5 is a view of the tension-spring C. Fig. 6 is a view of the tension-nut c, which, in combination with the screw d, secures the tension-spring to the plate B.

The construction and operation are as follows: The tension-spring C, Fig. 5, is of sheet metal, preferably of steel, blanked out in a suitable die. The upward-projecting sides e e' are formed, securing a seat for the nut c. The hole f admits the screw d, as seen at Fig. 3. The extremity of the fork h on the other end of the spring C, Fig. 5, formed by the diagonal slot g, is slightly curved upward to facilitate the entering of the thread in the slot. The projections i i' are preferably curved upward, forming a leverage for the spring. The projections i i' are inserted in the holes j j in the plate B, Fig. 4. The end of the spring holding the nut c rests on the projection K of the plate B, and secured to the same by the screw d, passing through the holes l of the plate and f of the spring, and into the threaded nut c.

One advantage of the independent nut c is the spring can be made of thin metal, possessing a more uniform degree of elasticity throughout its whole length, whereas if the end of the spring were threaded for the screw it would have to be made of thicker material and drawn or reduced down thin enough from the hole to the end to make it sufficiently elastic. A spring thus constructed is far more expensive, besides lacking that uniformity of tension which a spring blanked from rolled-sheet metal would possess. Another advantage of the independent nut is the spring is brought down square and kept parallel with the plate, which would not be the case if the spring were threaded. Rounding the nut on the bottom, as shown at Fig. 6, obviates any tendency to cramp the spring.

In threading the shuttle (see Fig. 2) the thread is drawn from the bobbin D and thrown around the curved point $n$ of the fork $h$, thence in the direction indicated by the arrow, and into the slot $a$ of the latch or plate B, and drawn taut, the thread passing down the slot $a$ and resting in the thread-hole $b$, and operating also in like manner in the spring C, resting in the hole $o$ and between the spring and plate.

Having thus described my invention, what I claim as new, and desire to secure by Letters Patent, is—

1. In a sewing-machine shuttle, the combination of the tension-spring C, having one end provided with the upward-projecting sides $e\ e$ and hole $f$, with the screw $d$, threaded nut $c$, and plate B, as set forth.

2. The combination of the tension-spring C, having upward-projecting sides $e\ e$, hole $f$, diagonal slot $g$, curved point $n$, projections $i\ i'$, with the plate B, having holes $j\ j$ and $l$, and, with the threaded nut $c$ and screw $d$, as set forth.

In testimony that I claim the foregoing I have hereunto set my hand this 24th day of March, 1881.

RUFUS LEAVITT.

Witnesses:
HERMAN GAUSS,
WILLIAM HOUGHTALING.